3,322,722
ACIDIC INTERCHANGE OF SILOXANE BONDS WITH SILICON-BONDED ALKOXY AND ACYLOXY BONDS
Benjamin A. Eynon, Midland, Mich., assignor to Dow Corning Corporation, Midland, Mich., a corporation of Michigan
No Drawing. Filed Oct. 18, 1965, Ser. No. 497,531
11 Claims. (Cl. 260—46.5)

This application relates to a new process for the synthesis of organopolysiloxanes which contain silicon-bonded alkoxy or acyloxy groups.

The process, which is particularly useful in the preparation of room-temperature curing silicone gels and elastomers, comprises reacting at a temperature of 20° to 150° C., in the presence of a catalyst selected from the group consisting of strong acids and acidic salts thereof, (a) a silicone reactant comprising at least one organosilicon compound, said silicone reactant containing (1) siloxane bonds and
(2) bonds selected from the group consisting of silicon-bonded lower alkoxy and silicon-bonded lower acyloxy, the other bonds in said silicone reactant consisting essentially of those selected from the group consisting of ≡SiH, Si-monovalent hydrocarbon, Si-monovalent halohydrocarbon, Si-divalent hydrocarbon-Si, and Si-divalent halohydrocarbon-Si, whereby an exchange reaction occurs between said bonds (1) and (2).

The preferred reaction temperature is from 50° to 130° C.

A typical example of the above process is shown by the following reaction:

(I)

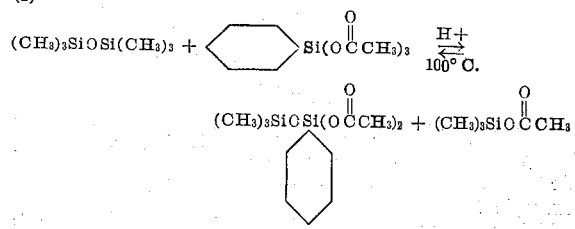

As can be seen there is a redistribution reaction between the siloxane and the silicon-acyloxy bonds of the above reactants. The reaction as shown is not complete, as an analogous reaction can take place between the hexamethyldisiloxane reactant and the phenyltrimethyldiacetoxy-disiloxane product, continuing the process of this application.

Ingredient (a) can be one or more silicone compounds. If it is a single compound, it must contain both siloxane bonds and either alkoxy or acyloxy bonds, e.g.

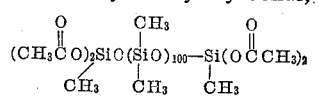

If ingredient (a) is more than one silicone compound the individual compounds need not contain both siloxane and alkoxy or acyloxy bonds, as long as both bonds are present in ingredient (a). An example of this type of situation is shown in the above chemical Equation I.

By "lower alkoxy" is meant radicals such as methoxy, ethoxy, isopropoxy, and n-hexoxy. By "lower acyloxy" is means radicals such as

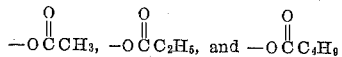

Ingredient (a) can also contain other radicals as defined above: suitable monovalent hydrocarbon radicals are alkyl and cycloalkyl radicals such as methyl, ethyl, propyl, sec-hexyl, cyclohexyl, and octadecyl; aliphatically unsaturated radicals such as vinyl, allyl, cyclohexenyl, and 2-butenyl; and aryl-containing radicals such as phenyl, tolyl, xenyl, naphthyl, and 2-phenylpropyl.

Examples of monovalent halohydrocarbon radicals are haloalkyl and halocycloalkyl radicals such as 3,3,3-trifluoropropyl, 5-chlorohexyl, and dibromocyclopentyl; aliphatically unsaturated radicals such as 4-bromobutenyl-2 and trifluorocyclohexenyl; and aryl-containing radicals such as chlorophenyl, dibromophenyl, α,α,α-trifluorotolyl, and iodoxenyl.

Examples of divalent hydrocarbon and halo-hydrocarbon radicals are methylene, hexamethylene,

—CH$_2$CH=CHCH$_2$— phenylene, xenylene, chlorophenylene, and tetrafluorophenylene.

Examples of suitable ingredients (a) are, therefore:

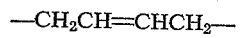

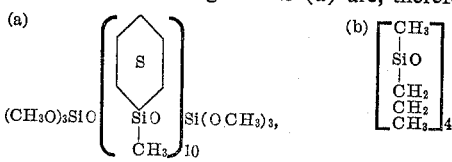

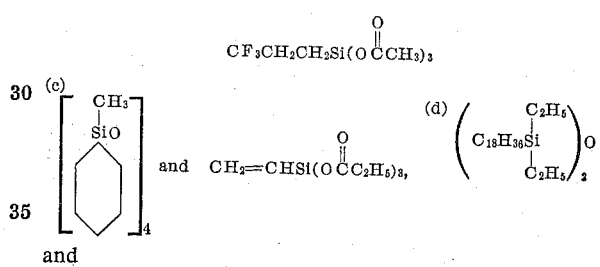

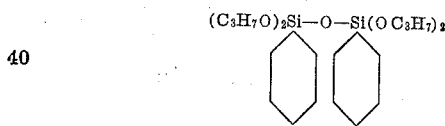

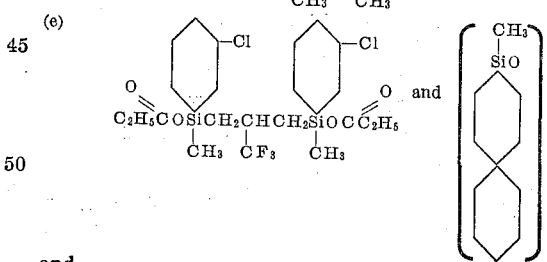

and

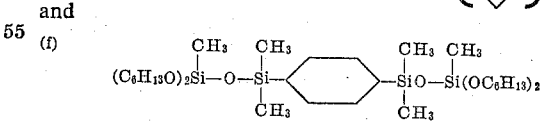

Further examples of ingredient (a) are shown below.

Any strong acid or acidic salt of a strong acid can be used as a catalyst in the process of this invention. The term "strong acid" includes any acid having a dissociation constant for its most acidic hydrogen atom of no less than 0.05 in a 0.1 N water solution at 25° C. The term "acidic salt of a strong acid" is defined as any salt of one of the above-defined acids which has a pH of less than 7 when tested as a 0.1 N water solution at 25° C. Those salts which are more strongly acidic tend to have more catalytic activity than those which are nearly neutral.

Examples of such acids are sulfuric, nitric, hydrochloric, picric, pyrophosphoric, chromic, toluenesulfonic, chloroplatinic, and trichloroacetic acids. Also included in the term "strong acid" are those ion exchange resins which have strong acid anions adsorbed or attached thereon. Examples of these are the commercially available sulfonated ion exchange resins. Acid clays are generally catalysts for this process, but they frequently cause undesirable side reactions and give poor yields. For example sulfuric acid-washed montmorrillonite is an operative catalyst in this invention.

Examples of operative acidic salts are zinc chloride, aluminum chloride, nickel sulfate, cobaltic nitrate, stannic chloride and ferric nitrate.

The amount of catalyst present is not critical although the rate of the reaction will be affected thereby. Generally, from 0.2 to 20 weight percent, based on the weight of the reaction mixture, can be used.

Solvents and dispersing agents can be used in this reaction, although they are frequently unnecessary. Water, as a rule, should be avoided, since both silicon-bonded alkoxy and acyloxy groups are hydrolyzable. Examples of suitable solvents are dichlorobenzene, biphenyl, dibutylether, dodecane, isoctane, perchloroethylene, benzene, and toluene.

The application also relates to the process of reacting at a temperature of 50° C. to 150° C. in the presence of a catalyst selected from the group consisting of strong acids and acidic salts thereof, from 40 to 45 mol percent of a cyclic polysiloxane of the formula $(R_2SiO)_n$ where R is selected from the group consisting of monovalent hydrocarbon and halohydrocarbon radicals and $n$ has a value of 3 to 8 with from 5 to 60 mol percent of an organosilicon compound of the average formula $$R_m SiR'_{4-m/2}$$

where R' is selected from the group consisting of lower alkoxy radicals and lower acyloxy radicals, and $m$ has an average value of 0 to 1.9, whereby a composition which is curable to a rubbery gel upon exposure to moisture is formed.

The materials produced by this process are generally of low viscosity, but they cure to elastomeric materials upon exposure to moisture, for example, the moisture of the air.

An idealized example of such a reaction is:

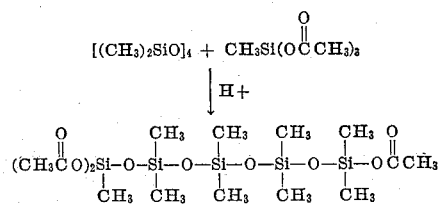

which compound is curable by hydrolysis of the acetoxy groups and subsequent condensation on exposure to moisture.

The following examples are illustrative only and should not be construed as limiting the invention, which is properly delineated in the appended claims.

*Example 1*

There was placed into each of three flasks the following: 30.4 g. of hexamethyldisiloxane, 27,7 g. of methyltriacetoxysilane, and the following weights of the following catalysts:

flask (a)—2.9 g. of a sulfonated divinylbenzene-crosslinked polystyrene ion exchange resin (Amberlyst 15)
flask (b)—0.58 g. of sulfuric acid
flask (c)—0.58 g. of zinc chloride.

The mixture was heated at 100° C. for about 23 hours. The products were analyzed by gas-liquid chromatography. Flasks (a), (b) and (c), were found to have produced a moderate to high yield of materials such as trimethylacetoxysilane, 1,1,1,3 - tetramethyldiacetoxydisiloxane, and 3-acetoxyheptamethyltrisiloxane.

*Example 2*

To 450 g. of a mixture of dimethylcyclopolysiloxanes consisting primarily of the cyclic tetramer and pentamer, there was added 20 g. of ethylorthosilicate and 10 g. of the sulfonated ion exchange resin of Example 1.

This mixture was heated at 80 to 90° C. for about 12 hours. After filtering, the low-vicosity fluid product was exposed to the air. It cured to a dry, bouncy rubber in a week.

This indicates that a siloxane-alkoxy exchange reaction had taken place to form polysiloxanes which are room-temperature curable by the known process of hydrolysis and condensation of silicon-bonded alkoxy groups.

*Example 3*

To 30 g. of a mixture of dimethylcyclopolysiloxanes consisting primarily of the cyclic tetramer and pentamer there was added 1 g. of methyltriacetoxysilane and 1 g. of the sulfonated ion exchange resin of Example 1.

This mixture was heated for 36 hours at 100° C. to yield a thick fluid that cures on exposure to the air for 24 hours to a clear, tacky, snappy elastomer, indicating that an acetoxysiloxane exchange reaction had taken place.

*Example 4*

To 370 g. of a mixture of dimethylcyclopolysiloxanes consisting primarily of the cyclic tetramer and pentamer, there was added 58 g. of vinyldimethylmethoxysilane and 21 g. of the sulfonated ion exchange resin of Example 1.

This was heated at about 80° C. for about 12 hours, and filtered. The product was distilled. A higher boiling fraction of the distillate contained

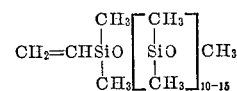

*Example 5*

To 216 g. of 2-ethylbutylorthosilicate there was added 148 g. of the dimethylcyclopolysiloxane mixture of Example 4 and 18 g. of the sulfonated ion exchange resin of Example 1.

This was heated for 24 hours at 100° C. Upon analysis by gas-liquid chromatography, it was found that the 2-ethylbutylorthosilicate content of the reaction mixture had declined considerably, compared with the original content.

The product cured to a sticky gel on exposure to the atmosphere for a week, giving further evidence that an alkoxysiloxane exchange reaction had taken place.

*Example 6*

To 128 g. of $[(CH_3)_3SiO]_4Si$ there was added 69.3 g. of ethylorthosilicate and 19.7 g. of the sulfonated ion exchange resin of Example 1.

This was heated at 89° C. for 18 hours to yield the following, as determined by gas-liquid chromatography: trimethylethoxysilane, hexamethyldisiloxane, and $$(C_2H_5O)_xSi(OSi[CH_3]_3)_{4-x}$$

where $x$ is 1, 2 and 3.

*Example 7*

To 50 g. of an equimolar mixture of hexamethyldisiloxane and ethylorthosilicate there was added 1.19 g. of oxalic acid.

This was heated at 70° C. for 48 hours to obtain a moderate yield of trimethylethoxysilane and $$(C_2H_5O)_3SiOSi(CH_3)_3$$

Example 8

The experiment of Example 7 was repeated, substituting 2.7 g. of heptafluorobutyric acid for the oxalic acid ingredient.

This was heated at 70° C. for 48 hours to obtain a low yield of the products of Example 7.

Example 9

To 162 g. of hexamethyldisiloxane there was added 60 g. of dimethyldimethoxysilane and a small amount of toluene-sulfonic acid.

This was heated at 80° C. for 24 hours to obtain a moderate yield of trimethylmethoxysilane, pentamethylmethoxydisiloxane, and octamethyltrisiloxane.

Example 10

To 106.4 g. of $$(CF_3CH_2CH_2\underset{\underset{CH_3}{|}}{\overset{\overset{CH_3}{|}}{Si}}-)_2O$$

there was added 20.8 g. of ethylorthosilicate and 6.3 g. of the sulfonated ion exchange resin of Example 1.

This was heated at 53° to 69° C. for 24 hours to yield the following products, as identified by gas-liquid chromatography:

$$CF_3CH_2CH_2\underset{\underset{CH_3}{|}}{\overset{\overset{CH_3}{|}}{Si}}OC_2H_5 \text{ and } (CF_3CH_2CH_2\underset{\underset{CH_3}{|}}{\overset{\overset{CH_3}{|}}{Si}}O)_xSi(OC_2H_5)_{4-x}$$

where $x$ is 1 and 2.

Example 11

To 92 g. of $$(ClCH_2\underset{\underset{CH_3}{|}}{\overset{\overset{CH_3}{|}}{Si}}-)_2O$$

there was added 20 g. of ethylorthosilicate and 5.6 g. of the sulfonated ion exchange resin of Example 1.

This was heated at 70° C. for 24 hours to yield chloromethyldimethylethoxysilane and $$(ClCH_2\underset{\underset{CH_3}{|}}{\overset{\overset{CH_3}{|}}{Si}}O)_xSi(OC_2H_5)_{4-x}$$

where $x$ is 1, 2 and 3.

Example 12

Equimolar amounts of n-propylorthosilicate and sym-tetramethyldisiloxane were heated at 82° C. for 24 hours in the presence of the sulfonated ion exchange resin of Example 1.

The following compounds were recovered, as determined by gas-liquid chromatography: dimethylhydrogenpropoxysilane and $$(CH_3CH_2CH_2O)_xSi\left(O\underset{\underset{CH_3}{|}}{\overset{\overset{CH_3}{|}}{Si}}H\right)_{4-x}$$

where $x$ is 3, 2, and 1, in order of the relative yield of each species.

Example 13

When a mixture of 2 g. of $$(CH_3O)_2Si(O\underset{\underset{CH_3}{|}}{\overset{\overset{CH_3}{|}}{Si}}C_8H_{17})_2$$

1 g. of

[structure: phenylene bridged disiloxane with Cl substituent]

and 0.1 g. of cupric sulfate are heated at 90° C. for 24 hours, the following products are recovered:

[structures showing various methoxysilyl-substituted chlorophenyl and related compounds including $CH_3OSi(OSiC_8H_{17})_2$ units]

$$\left(\underset{\underset{CH_3}{|}}{\overset{\overset{CH_3}{|}}{\text{-Si}}}\text{O}\right)_2 Si(OSiC_8H_{17})_3, \quad CH_3OSi(OSiC_8H_{17})_3$$

and other similar products.

Example 14

To 126 g. of a trimethylsiloxane-endblocked dimethylpolysiloxane having a viscosity at 25° C. of 200 cs. there was added 21 g. of ethylorthosilicate and 9 g. of the sulfonated ion exchange resin of Example 1.

This was heated for about 60 hours at 100° C. The product was mixed with a trace of dibutyltindiacetate and exposed to the air.

It cured to a greasy gel in one day, indicating that an alkoxy-siloxane exchange reaction had taken place.

Example 15

When 5 g. of $$CH_3C\overset{O}{\overset{\|}{}}O\underset{\underset{CH_3}{|}}{\overset{\overset{CH_3}{|}}{Si}}\text{-}\langle\text{-}\rangle\text{-}\underset{\underset{CH_3}{|}}{\overset{\overset{CH_3}{|}}{Si}}OC\overset{O}{\overset{\|}{}}CH_3$$

and 5 g. of octamethylcyclotetrasiloxane are heated at 110° C. in the presence of 0.5 g. of cobaltic chloride, a siloxane-acetoxy interchange reaction occurs, producing a copolymer of dimethylsiloxane units and $$\left(O\underset{\underset{CH_3}{|}}{\overset{\overset{CH_3}{|}}{Si}}\text{-}\langle\text{-}\rangle\text{-}\underset{\underset{CH_3}{|}}{\overset{\overset{CH_3}{|}}{Si}}\text{-}\right)$$

units which contains silicon-bonded acetoxy groups.

That which is claimed is:

1. The process of reacting at a temperature of 20° to 150° C., in the presence of a catalyst selected from the group consisting of strong acids having dissociation constants for their most acidic hydrogen atom of no less than 0.05 in a 0.1 N water solution at 25° C., and acidic salts thereof which have a pH of less than 7 when tested as a 0.1 N water solution at 25° C., a silicone reactant comprising at least one organosilicon compound, said silicone reactant containing (1) siloxane bonds and (2) bonds selected from the group consisting of silicon-bonded lower alkoxy and silicon-bonded lower acyloxy, the other bonds in said silicone reactant consisting essentially of those selected from the group consisting of ≡SiH, Si-monovalent hydrocarbon, Si-monovalent halohydrocarbon, Si-divalent hydrocarbon-Si, and Si-divalent halohydrocarbon-Si, whereby an exchange reaction occurs between said bonds (1) and (2).

2. The process of claim 1 where the catalyst is a sulfonated, crosslinked, polystyrene resin.

3. The process of claim 1 where the catalyst is sulfuric acid.

4. The process of claim 1 where the reaction temperature is from 50° to 130° C.

5. The process of reacting at a temperature of 50° to 150° C., in the presence of a catalyst selected from the group consisting of strong acids having dissociation constants for their most acidic hydrogen atom of no less than 0.05 in a 0.1 N water solution at 25° C., and acidic salts thereof which have a pH of less than 7 when tested as a 0.1 N water solution at 25° C., from 40 to 95 mol percent of a cyclic polysiloxane of the formula $(R_2SiO)_n$ where R is selected from the group consisting of monovalent hydrocarbon and halohydrocarbon radicals and $n$ has a value of 3 to 8 with from 5 to 60 mol percent of organosilicon compound of the average formula $$R_mSiR'_{4-m/2}$$

where R' is selected from the group consisting of lower alkoxy radicals and lower acyloxy radicals, and $m$ has an average value of 0 to 1.9, whereby a composition which is curable to a rubbery gel upon exposure to moisture is formed.

6. The process of claim 5 where R is methyl.
7. The process of claim 5 where R' is acetoxy.
8. The process of claim 5 where R' is methoxy.
9. The process of claim 5 where R' is ethoxy.
10. The process of claim 5 where the catalyst is a sulfonated, crosslinked polystyrene resin.
11. The process of claim 5 where the catalyst is sulfuric acid.

References Cited
UNITED STATES PATENTS

| | | | |
|---|---|---|---|
| 2,430,032 | 11/1947 | Scott | 260—46.5 |
| 2,437,204 | 3/1948 | McGregor et al. | 260—46.5 |
| 2,627,451 | 2/1953 | Erickson et al. | 260—448.8 |
| 2,637,719 | 5/1953 | Dereich | 260—46.5 |
| 2,909,549 | 10/1959 | Bailey | 260—46.5 |
| 3,004,053 | 10/1961 | Shiihara | 260—448.8 |
| 3,037,052 | 5/1962 | Botnick | 260—485 |
| 3,186,967 | 6/1965 | Nitzsche et al. | 260—46.5 |
| 3,192,241 | 6/1965 | Roebuck | 260—46.5 |

DONALD E. CZAJA, *Primary Examiner.*

LEON J. BERCOVITZ, *Examiner.*

M. MARQUIS, *Assistant Examiner.*